(12) United States Patent
Sato (10) Patent No.: US 11,288,020 B2
(45) Date of Patent: Mar. 29, 2022

(54) NON-TRANSITORY COMPUTER-READABLE MEDIUM STORING APPLICATION PROGRAM AND METHOD FOR CONTROLLING INFORMATION PROCESSING DEVICE FOR PRINTING BY A PLURALITY OF PRINTERS

(71) Applicant: BROTHER KOGYO KABUSHIKI KAISHA, Nagoya (JP)

(72) Inventor: Hirotaka Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 45 days.

(21) Appl. No.: 16/878,847

(22) Filed: May 20, 2020

(65) Prior Publication Data

US 2020/0371722 A1 Nov. 26, 2020

(30) Foreign Application Priority Data

May 24, 2019 (JP) .............................. JP2019-097612

(51) Int. Cl.
*G06F 3/12* (2006.01)

(52) U.S. Cl.
CPC ............ *G06F 3/1203* (2013.01); *G06F 3/125* (2013.01); *G06F 3/1253* (2013.01)

(58) Field of Classification Search
None
See application file for complete search history.

(56) References Cited

U.S. PATENT DOCUMENTS

| 7,167,260 | B2 * | 1/2007 | Iwata | G06F 3/1205 |
| | | | | 358/1.15 |
| 7,349,638 | B2 * | 3/2008 | Mima | B41J 2/17546 |
| | | | | 399/10 |
| 9,058,139 | B2 * | 6/2015 | Takamoto | G06F 3/1244 |
| 2010/0218093 | A1 * | 8/2010 | Sakamoto | H04N 1/00915 |
| | | | | 715/274 |
| 2015/0070733 | A1 * | 3/2015 | Bernardo | G06F 3/1222 |
| | | | | 358/3.28 |

FOREIGN PATENT DOCUMENTS

JP 2002-333964 A 11/2002

* cited by examiner

*Primary Examiner* — Paul F Payer
(74) *Attorney, Agent, or Firm* — Scully, Scott, Murphy & Presser, PC (57) ABSTRACT

A non-transitory computer-readable medium storing an application program readable by a computer of an information processing device, the application program, when executed by the computer, causes the information processing device to perform: displaying a first image object and a second image object on a display device of the information processing device; and based on receiving a print instruction via an input device of the information processing device, controlling a first printer to perform printing of a first image based on the first image object and a second printer to perform printing of a second image based on the second image object.

18 Claims, 11 Drawing Sheets

# NON-TRANSITORY COMPUTER-READABLE MEDIUM STORING APPLICATION PROGRAM AND METHOD FOR CONTROLLING INFORMATION PROCESSING DEVICE FOR PRINTING BY A PLURALITY OF PRINTERS

CROSS-REFERENCE TO RELATED APPLICATIONS

This application is based upon and claims the benefit of priority from prior Japanese patent application No. 2019-097612 filed on May 24, 2019, the entire contents of which are incorporated herein by reference.

TECHNICAL FIELD

The present disclosure relates to an application program that can be executed by a computer of an information processing device and a method for controlling an information processing device.

BACKGROUND

In a system including a plurality of printers and an information processing device, there has been known a distributed printing of dividing one print job in a page unit or a copy unit by the information processing device, distributing the divided print jobs to each printer and executing the same by each printer. For example, there has been disclosed a related-art technology of, when causing a plurality of printers corresponding to the same format of printer data to execute print jobs divided by a personal computer, collectively converting a print job into printer data before dividing the print job.

SUMMARY

For example, there is a case where it is necessary to generate different printed materials by a plurality of different types of printers, such as a case of attaching a label having characters printed thereon to a poster having a photograph printed thereon. In this case, it is necessary to instruct printing for poster and printing for label by dedicated application programs, which is troublesome to a user. The related-art technology relates to technology in which the plurality of printers handles the same format of printer data, i.e., technology for implementing the distributed printing by the same type of printers, and is unable to deal with the above case.

The present disclosure provides technology by which a user's effort is reduced when it is necessary to generate different printed materials by each of a plurality of printers, in an information processing device capable of performing communication with the printers.

One illustrative aspect of the present disclosure provides a non-transitory computer-readable medium storing an application program readable by a computer of an information processing device, the application program, when executed by the computer, causes the information processing device to perform: displaying a first image object and a second image object on a display device of the information processing device; and based on receiving a print instruction via an input device of the information processing device, controlling a first printer to perform printing of a first image based on the first image object and a second printer to perform printing of a second image based on the second image object.

The information processing device having the application program disclosed herein displays the two image objects of the first image object and the second image object. When a print instruction is received, the separate printers are caused to print images based on the respective image objects. According to this configuration, an operation on one application program can cause each of the printers to generate different printed materials, so that a user's effort is reduced.

Another illustrative aspect of the present disclosure provides a method for controlling an information processing device to perform: displaying a first image object and a second image object on a display device of the information processing device; and based on receiving a print instruction via an input device of the information processing device, controlling a first printer to perform printing of a first image based on the first image object and a second printer to perform printing of a second image based on the second image object.

An information processing device having the application program installed therein, a storage medium that can be read by a computer having the application program stored therein, and a control method for implementing functions of the application program are also useful and novel.

According to the technology discussed herein, it is possible to implement the technology by which a user's effort is reduced when it is necessary to generate different printed materials by each of the plurality of printers, in the information processing device capable of performing communication with the printers.

BRIEF DESCRIPTION OF DRAWINGS

Illustrative embodiments of the disclosure will be described in detail based on the following figures, wherein.

DETAILED DESCRIPTION

Hereinbelow, a first aspect will be described in detail with reference to the accompanying drawings. The first aspect discloses an illustrative embodiment of implementing an application program (hereinbelow, referred to as "application") that is executed by a mobile device capable of connecting to both a label printer and a printer of a type other than the label printer.

Figure 1:
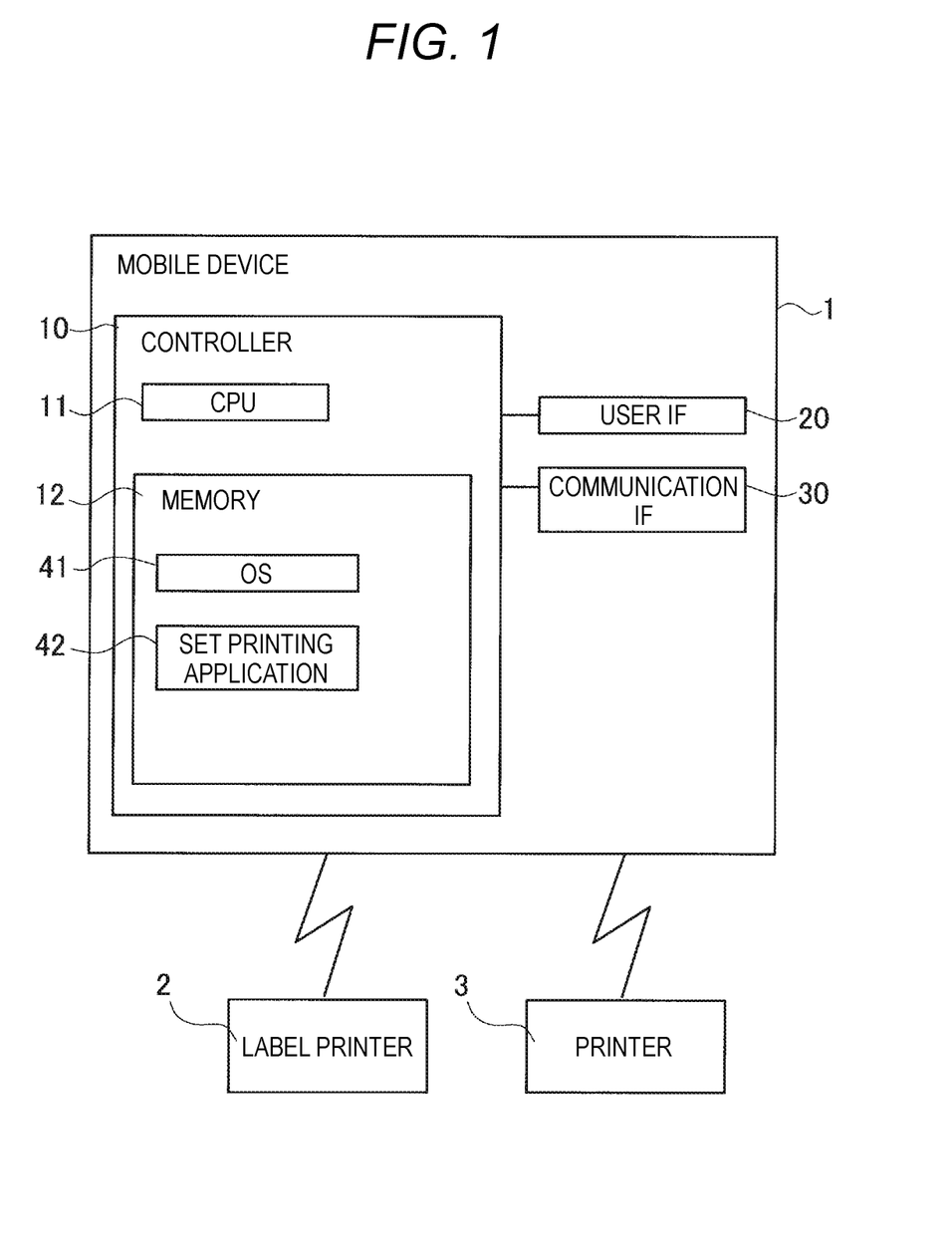
FIG. 1 is a block diagram depicting an electrical configuration of a mobile device of a first aspect.

As shown in FIG. 1, a mobile device 1 of the first aspect includes a controller 10, a user interface (hereinbelow, referred to as "user IF") 20, and a communication interface (hereinbelow, referred to as "communication IF") 30. The user IF 20 and the communication IF 30 are electrically connected to the controller 10. The mobile device 1 is, for example, a smart phone, a tablet-type computer, and a laptop-type personal computer. The mobile device 1 is an example of an information processing device.

As shown in FIG. 1, the controller 10 of the mobile device 1 includes a CPU 11 and a memory 12. The memory 12 includes a ROM, a RAM, and a non-volatile memory, and stores diverse programs, data and the like. In the present disclosure, the details of the memory are not distinguished.

The CPU 11 is configured to execute a variety of processing, in accordance with programs read out from the memory 12, and based on a user's instruction. The CPU 11 or the controller 10 is an example of a computer. In the meantime, the controller 10 in FIG. 1 is a collective term for hardware and software used for control of the mobile device 1, and does not necessarily represent single hardware that is actually provided in the mobile device 1.

As shown in FIG. 1, in the memory 12, an operating system (hereinbelow, referred to as "OS") 41, and a set printing application 42 are stored. The OS 41 is, for example, iOS (registered trademark) or Android (registered trademark). The set printing application 42 will be described later.

The user IF 20 is, for example, a touch panel, and includes hardware having a function of receiving a user's input operation and a function of displaying information. The user IF 20 is an example of a display device and is also an example of an input device. In the meantime, the display device and the input device may also be separate devices. That is, the user IF 20 may be a combination of a display having a display function and a keyboard, a mouse and the like having an input receiving function.

The communication IF 30 includes hardware for performing communication with a variety of external devices. As shown in FIG. 1, the mobile device 1 can perform communication with both the label printer 2 and the printer 3 via the communication IF 30. The communication IF 30 may include a plurality of interfaces of which communication methods are different. The communication methods include, for example, a wired or wireless network communication, a USB communication, and a near field communication such as Bluetooth (registered trademark). A communication method between the mobile device 1 and the label printer 2 and a communication method between the mobile device 1 and the printer 3 may be the same or different. Also, the mobile device 1 can connect to the Internet via the communication IF 30.

The label printer 2 is an apparatus having a printing head of a thermal transfer type and configured to perform printing on a band-shaped label paper wound in a roll shape, for example. The label printer 2 is an example of a first printer. The label paper is a paper of which a backside of a printing surface is an adhesive surface and a release paper is provided on the adhesive surface. The label printer 2 is configured to perform printing on the label paper, based on a received print job, to convey the label paper, and to cause the printed label paper to protrude to an outside from a discharge port. The protruding part is cut by a cutter or the like, so that a printed label is prepared.

Hereinbelow, among sizes of a label to be prepared, a size of the label paper in a conveying direction by the label printer 2 is set as "label length". The label length is an example of a length of the label in the first direction. Also, among sizes of a label to be prepared, a size of the label paper in a direction perpendicular to the conveying direction by the label printer 2 is set as "label width". The label width is determined by a type of the label paper set on the label printer 2. In the meantime, the label printer 2 can deal with label papers having a plurality of types of widths or can set only a label paper having one type of width.

In the meantime, the label length can be set, based on a user's instruction and the like. A print job that is transmitted to the label printer 2 includes a setting on the label length. The label printer 2 is configured to prepare a label having a designated length by providing a margin before and after an image part on which characters and the like are printed, based on a setting of a received print job. In the meantime, the label printer 2 may include an option device such as a cutter option.

The printer 3 is a printer of a type other than the label printer, and is an apparatus having a function of performing printing on diverse printing media other than the label paper. The printer 3 is an example of a second printer. A printing method of the printer 3 is, for example, an inkjet method or an electrophotographic method. The printer 3 may be a general-purpose printer configured to perform printing on a sheet having a standard size such as A4, a large-scaled printer configured to perform printing on a large-sized sheet such as A2, a dedicated printer configured to perform printing on a sheet having a postcard size or a photograph sheet, or a printer of a special use configured to perform printing on a fabric, an optical disk surface, a metal surface and the like. Also, the printer 3 may be an apparatus capable of performing color printing or an apparatus capable of performing only monochrome printing. The printer 3 may be an apparatus capable of performing duplex printing or an apparatus capable of performing one-side printing.

Subsequently, the set printing application 42 is described. The set printing application 42 of the first aspect is an application configured to execute both processing of causing the label printer 2 to perform printing so as to prepare a label and processing of causing the printer 3 perform printing so as to prepare a printed material other than a label. The set printing application 42 is an example of application program.

For example, when attaching a printed material such as a poster by using a label, there is a case where it is intended to decorate the label, to design a layout of the label and to form the poster and label into a desired decoration as a whole. If the poster and the label are separately prepared, an image after the attachment may be different from expected. The set printing application 42 of the first aspect is an application that prepares a printed material and a label for attaching a printed material by using a label. It is assumed that the label and printed material prepared by the set printing application 42 of the first aspect are attached with being at least partially overlapped.

The set printing application 42 is configured to display, on the user IF 20, a label object including an image that is to be printed by the label printer 2, and a sheet object including an image that is to be printed by the printer 3. The set printing application 42 is configured to transmit a print job based on the label object to the label printer 2, and to transmit a print job based on the sheet object to the printer 3, in response to receiving a print instruction. The label object is an example of a first image object, and the sheet object is an example of a second image object.

The set printing application 42 of the first aspect is configured to receive a selection of an image for poster, as the sheet object, and a setting on an image for label to which a poster is to be attached, as the label object, for example. The set printing application 42 is configured to display, on the user IF 20, the sheet object and the label object at the same time with being partially overlapped, for example. The set printing application 42 of the first aspect can display, on the user IF 20, an overall image of a case where a printed material is attached using a label, for example.

Subsequently, a sequence of set print processing of generating a label and a printed material in the set printing application 42 of the first aspect is described with reference to a flowchart of FIG. 2. The set print processing is executed by the controller 10 when an instruction to execute the set printing application 42 is received.

In the set print processing, the controller 10 first determines whether devices that are used as printing apparatuses are set (S101). The controller 10 determines whether the label printer 2 and the printer 3 are set as devices to be used and communication can be performed with any of the printers. When it is determined that at least one is not set (S101: NO), the controller 10 receives a setting on a device (S102).

The controller 10 causes the OS 41 to search for devices by using a search command of the OS 41, for example. Then, the controller 10 displays, on the user IF 20, a list of searched devices, and receives a user's selection. The processing of S102 is an example of a selection processing. If a device is selected after receiving a setting on each object, a device that cannot appropriately print the set object may be selected. A device is first selected, so that it is possible to make a setting on an image suitable for the device. Therefore, the setting made by the user is prevented from being useless.

After S102 or when it is determined that both the label printer 2 and the printer 3 are set (S101: YES), the controller 10 obtains capabilities of each device (S103). The controller 10 obtains, from the label printer 2, information about a type of a set label paper and an installed option, for example. The controller 10 obtains, from the printer 3, a type of a printable print medium and a range of a receivable print setting, for example. Also, the controller 10 obtains default print settings of the label printer 2 and the printer 3.

Then, the controller 10 receives a selection of a sheet object including an image that is to be printed by the printer 3 (S104). The processing of S104 is an example of a second setting processing. The controller 10 receives a user's selection from diverse images stored in the memory 12. The images to be selected include an image captured by a camera of the mobile device 1, an image obtained from an external device by scan or downloading, and an image prepared by an application of the mobile device 1, for example. Also, the set printing application 42 may receive an edition on the selected image. In this case, an edited object becomes a sheet object.

Figure 3A:
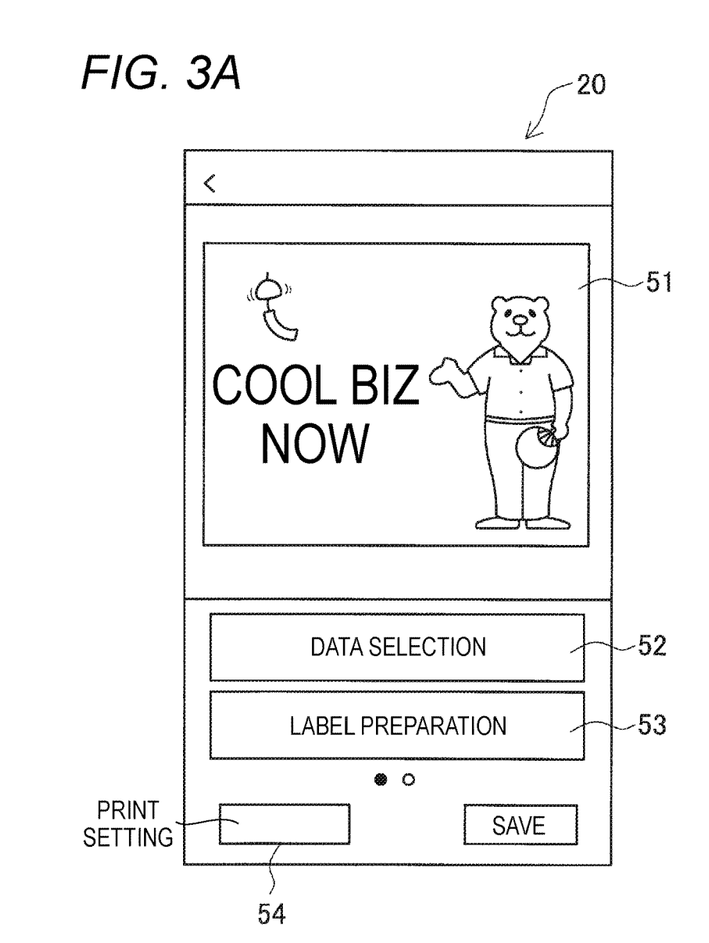
FIGS. 3A and 3B illustrate an example of a display screen that is shifted to label preparation after displaying a selected sheet object.

As shown in FIG. 3A, for example, the controller 10 displays the selected sheet object 51 on the user IF 20 (S105). The controller 10 generates the sheet object 51 to be displayed, based on the default print setting of the printer 3 obtained in S103. In the example of FIG. 3A, a variety of buttons such as a button 52 for receiving an instruction to redo a selection of a sheet object, a button 53 for receiving an instruction to prepare a label, a button 54 for receiving an instruction to change a print setting, and the like are displayed on the user IF 20, in addition to the sheet object 51.

Then, the controller 10 determines whether or not to change the print setting when causing the printer 3 to print the sheet object (S106). When an operation on the button 54 for receiving an instruction to change a print setting is received, for example, the controller 10 determines that the print setting is to be changed (S106: YES), and receives a designation of the print setting (S107). After changing the print setting, the controller 10 returns to S105, displays the sheet object 51 after the change, and again determines whether or not to change the print setting. In a case where the received instruction is an instruction by which a display state of the sheet object 51 is not changed, such as a change of a sheet tray, the controller 10 may skip over S105.

When it is determined that the print setting is not changed (S106: NO), the controller 10 determines whether an instruction to prepare a label is received (S108). When an operation on the button 53 displayed on the user IF 20 is received, the controller 10 determines that an instruction to prepare a label is received. When it is determined that an instruction to prepare a label is not received (S108: NO), for example, when an operation on the button 52 for receiving an instruction to redo a selection of a sheet object is received, the controller 10 returns to S104, and receives a reselection of a sheet object. The controller 10 stands by until any button is operated.

When it is determined that an instruction to prepare a label is received (S108: YES), the controller 10 executes label preparation processing (S110). The label preparation processing is processing of setting a label object including an image that is to be printed by the label printer 2. The label preparation processing is an example of a first setting processing. A sequence of the label preparation processing is described with reference to a flowchart of FIG. 4.

Figure 4:
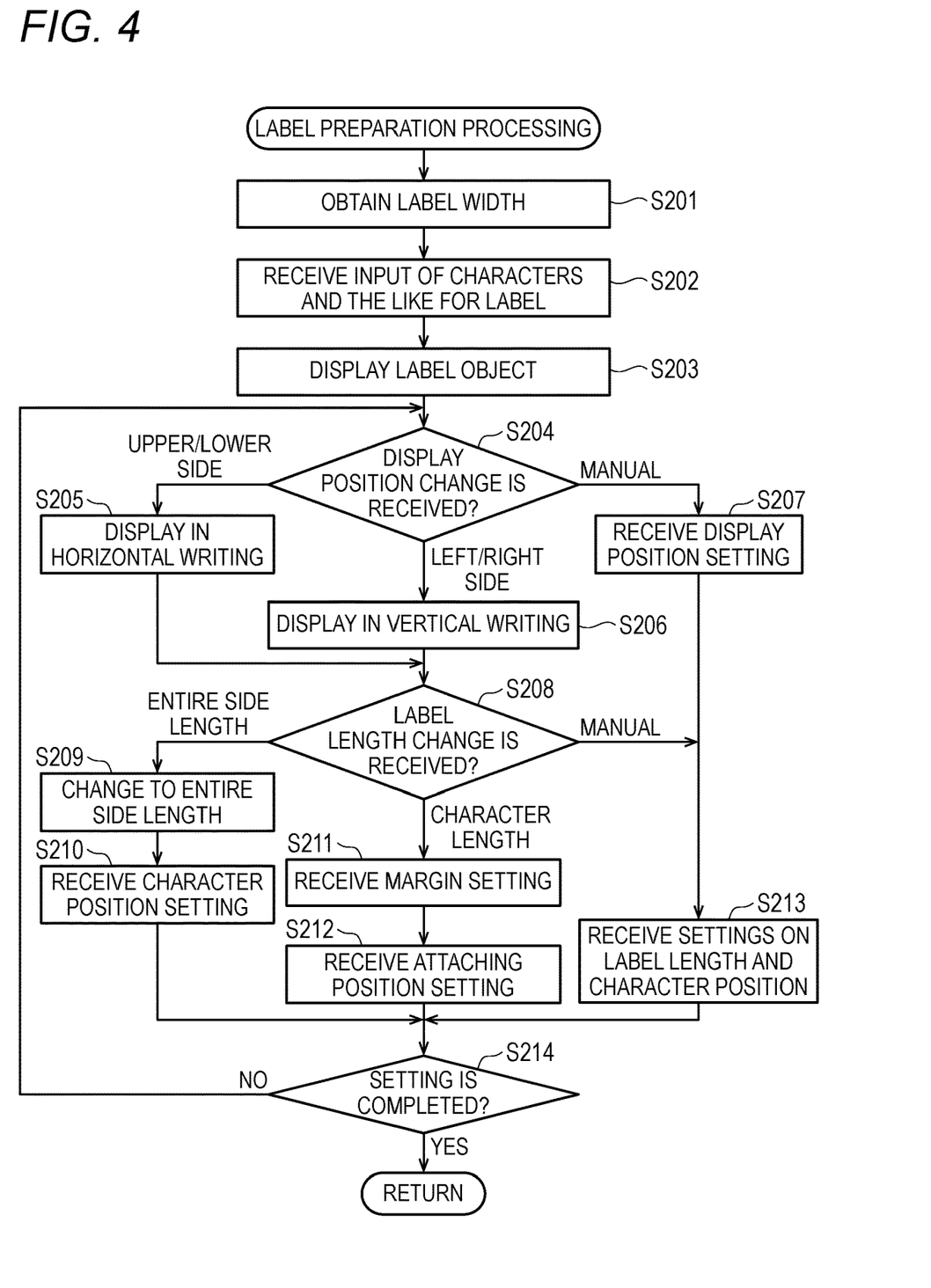
FIG. 4 is a flowchart depicting a sequence of label preparation processing.

In the label preparation processing, the controller 10 obtains information of a label width, based on the information about the label paper set in the label printer 2 (S201). Since the information about the label paper is obtained in S103 of the set print processing, the controller 10 can read out necessary information from the obtained information. In the meantime, considering a case where the label paper has been replaced after S103, the controller 10 may perform communication with the label printer 2 at a timing of S201 and obtain the information about the label paper.

Figure 3B:
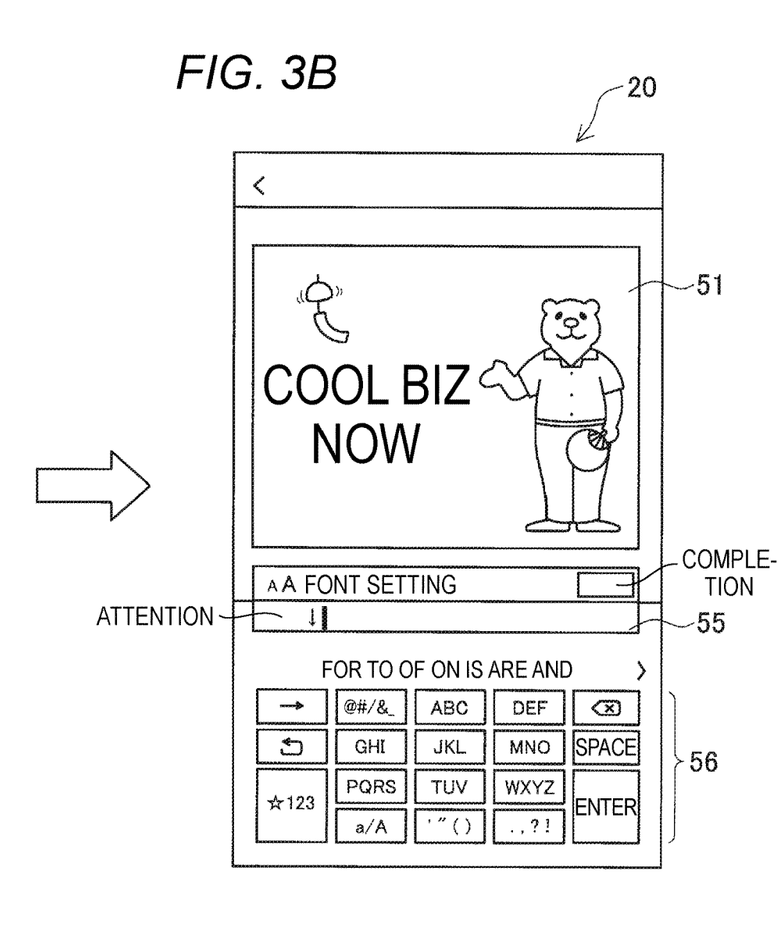

After S201, the controller 10 receives an input of characters and the like that are to be printed on a label (S202). For example, as shown in FIG. 3B, the controller 10 displays, on the user IF 20, an input column 55 and a software keyboard 56 for receiving a character input, and receives an input on the input column 55. The controller 10 may receive, as information to be included in the label object, an image such as a photograph and an illustration and a designation of a 2D code, in addition to the characters.

Figure 5A:
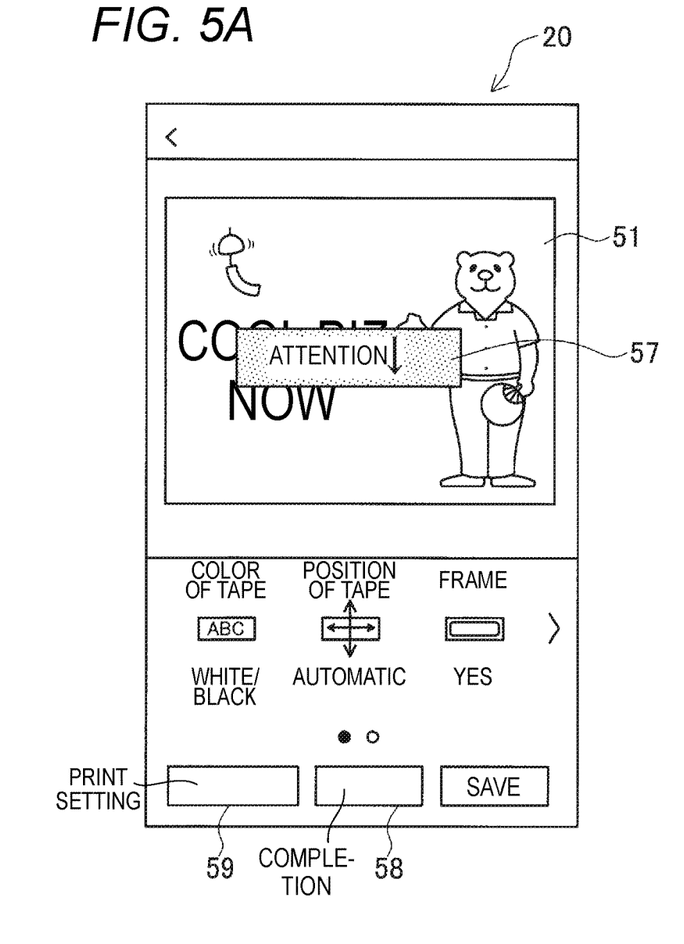
FIGS. 5A and 5B illustrate an example of a display screen of displaying a label object.

After the input on the input column 55 is completed, the controller 10 displays, on the user IF 20, a label object 57 including the input-received characters and the like, as shown in FIG. 5A, for example (S203). The controller 10 displays the label object 57 with being at least partially overlapped with the sheet object 51 in a state where the sheet object 51 already selected at the time when the instruction to prepare a label was selected is displayed. The processing of S203 is an example of a display processing. In the meantime, the label object 57 is displayed with being overlapped with the sheet object 51, and an image of the label object 57 is not synthesized with an image of the sheet object 51.

In the meantime, the controller 10 displays the label object 57 to be displayed at the same scale as a scale of the sheet object 51. The scale of the sheet object 51 can be obtained, based on the print setting of the printer 3. Also, the controller 10 prepares the label object 57, based on a character size and a margin size of the default print setting of the label printer 2, for example. In S203, the controller 10 determines a label length of the label object 57 to be displayed, based on a length of the input-received characters and the like, for example. In FIG. 5A, an example where the label object 57 is displayed with being overlapped at a center of the sheet object 51 is shown. However, a display position of the label object 57 displayed in S203 is not limited to the example of FIG. 5A and may be any position.

Then, the controller 10 receives a detailed setting of the label to be prepared. Specifically, the controller 10 receives an instruction to change a display position of the label object 57 with respect to a display position of the sheet object 51 (S204). The display position of the label object 57 corresponds to an attaching position of a label based on the label object 57 to a printed material based on the sheet object 51. By changing the display position of the label object 57, it is possible to edit an image at the time when attaching a label to a printed material.

The controller 10 receives, as the display position, a designation of automatic arrangement on a side of the sheet object 51 in an upper and lower direction or in a right and left direction, for example. When a designation on an upper or lower side of the sheet object 51 is received (S204: upper/lower side), the controller 10 sets an alignment direction of characters and the like to a horizontal writing direction and changes the display position of the label object 57 to a position overlapping the designated upper or lower edge (S205). For example, when a designation of automatic arrangement on the upper side is received, the controller 10 sets the label length to the horizontal direction, and changes the display position of the label object 57 to a position in which the upper side of the sheet object 51 and a center of the label width overlap. The processing of S205 is an example of a rearrangement processing.

Also, when a designation of a left or right side of a sheet image is received as the display position (S204: left/right side), the controller 10 sets an alignment direction of characters and the like to a vertical writing direction and changes the display position of the label object 57 to a position overlapping the designated left or right edge (S206). For example, when a designation of automatic arrangement on the left side is received, the controller 10 sets the label length to the vertical direction, and changes the display position of the label object 57 to a position in which the left side of the sheet object 51 and the center of the label width overlap. The processing of S206 is an example of the rearrangement processing.

For example, when attaching a sheet-shaped printed material by using a label, it is assumed that the label will be arranged on a side of the printed material, in many cases, and many users want to arrange the label object 57 along a side of the sheet object 51. In the present illustrative embodiment, the automatic arrangement of the label object 57 on a side of the sheet object 51 is received, which may reduce a user's effort to arrange the label.

Also, the controller 10 receives a manual setting on the display position. When a manual setting on the display position is received (S204: manual), the controller 10 receives, for example, a change of the display position made by a drag or roll operation on the label object 57 under display (S207). In the meantime, the vertical wiring/horizontal writing may be automatically switched, in accordance with a displayed angle of the label object 57 or a user's designation. Also, in a case of the label printer 2 that can rotate in a character unit, it can be rotated in a character unit, in accordance with an angle or the like of the label object 57. By receiving the manual setting, it is possible to increase a degree of freedom of the arrangement of the label object 57.

After S205 or S206, the controller 10 receives an instruction to adjust a size of the label object 57, i.e., an instruction to change the label length (S208). The controller 10 receives, as the instruction to change the label length, for example, an instruction to adjust the label length to an entire length of the side of the sheet object 51 on which the label object 57 is arranged with being overlapped, i.e., an instruction to adjust the label length to an entire length of a side of a printed material on which the sheet object 51 is printed. When a designation to adjust the label length to the entire side length is received (S208: entire side length), the controller 10 changes the label length of the label object 57 to the entire side length of the sheet object 51 (S209). The processing of S209 is an example of a resizing processing.

By changing the label length based on the side length of the printed material on which the sheet object 51 is printed, it is possible to secure a necessary length of the label for attaching the printed material. In the meantime, the controller 10 may receive a setting of the label length based on a side length, other than the entire side length. For example, a predetermined ratio of a length to the entire side length may be used.

Figure 5B:
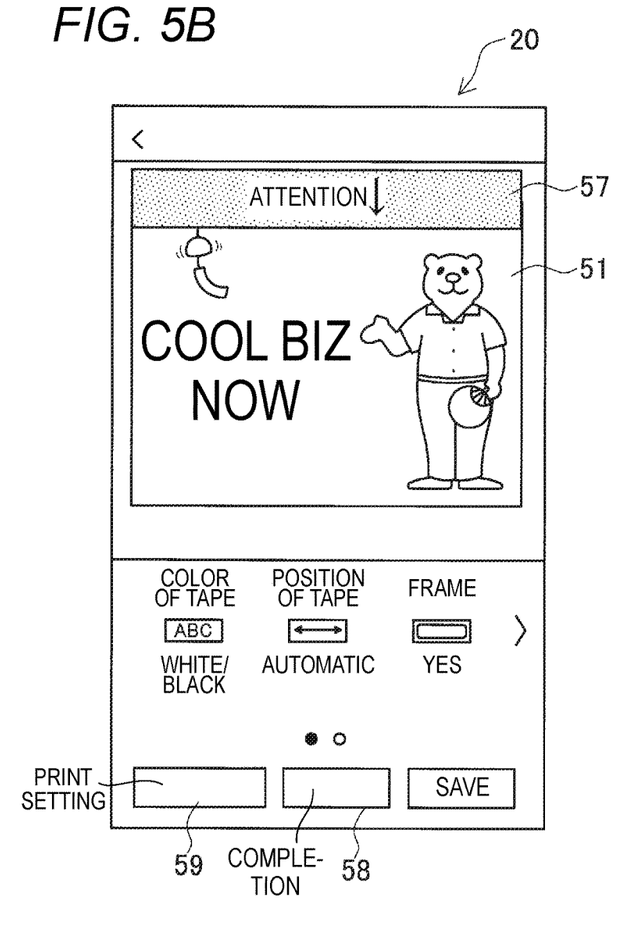

Also, the controller 10 receives a setting of positions of characters and the like in the label (S210). The controller 10 receives, as a position of characters, for example, a designation of left (top) alignment, center alignment or right (bottom) alignment. For example, when the upper side, the entire side length and the center alignment are selected for the label object 57, the controller 10 displays the label object 57 while arranging the characters at the center with overlapping the entire upper side of the sheet object 51, as shown in FIG. 5B. The label object 57 is moved and displayed with respect to the sheet object 51, so that the user can easily imagine a state in which the label is attached to the printed material.

In the meantime, when a designation to adjust the label length to a character length of characters and the like included in the label object 57 is received (S208: character length), the controller 10 receives a setting on the margins before and after the characters and the like (S211). In the meantime, when the setting on the margins is received, the controller 10 may further receive the setting of the character position, like the processing of S210. Also, the controller 10 receives a detailed setting on the display position of the label object 57 (S212). The controller 10 receives, as the display position, for example, a designation of left (top) alignment, center alignment or right (bottom) alignment. Then, the controller 10 changes the label length of the label object 57, based on the received designation, and displays the label object in the designated position.

Also, the controller 10 receives a manual setting on the label length. After S207 or when the manual setting on the label length is received (S208: manual), the controller 10 receives, for example, a setting on the label length made by a pinch-in or out operation on the label object 57 under display (S213). The controller 10 may further freely receive a setting on the label length and character position by a numerical value input. Then, the controller 10 changes and displays the label object 57, based on the received instruction.

After S210, S212 or S213, the controller 10 determines whether the setting on the label object 57 has been completed (S214). For example, as shown in FIG. 5, the controller 10 displays, on the user IF 20, a button 58 for receiving an instruction indicative of completion of the setting on the label object 57, and determines that the setting on the label object 57 has been completed when an operation on the button 58 is received.

When it is determined that the setting on the label object 57 has not been completed (S214: NO), the controller 10 returns to S204 or S208, and changes and displays the label object 57, based on the received instruction. On the other hand, when it is determined that the setting on the label object 57 has been completed (S214: YES), the controller 10 ends the label preparation processing, and returns to the set print processing of FIG. 2.

In the meantime, the controller 10 may receive, as the setting on the label object 57, diverse print settings, in addition to the settings on the display position and the label length. The controller 10 may display, for example, a button 59 for receiving an instruction to change the print setting on the user IF 20, as shown in FIG. 5, and receive an operation on the button 59. Then, the controller 10 may receive the detailed print setting such as a change of a margin, an addition of a frame and the like. In the meantime, when the label length is changed and the characters and the like of the label object 57 do not fit in the designated label length, the controller 10 may automatically change a character size or notify an error, for example.

Figure 2:
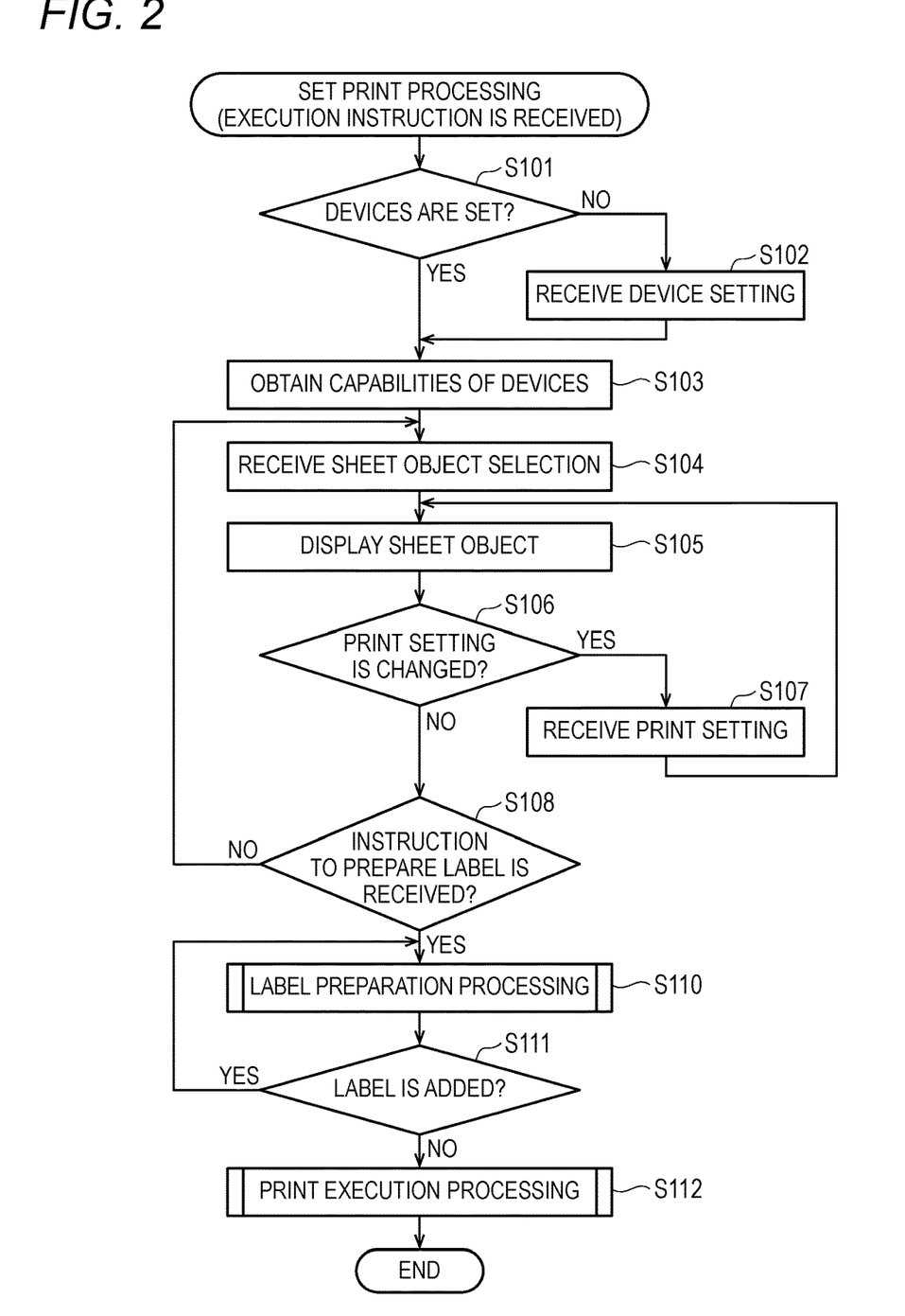
FIG. 2 is a flowchart depicting a sequence of set print processing.

Returning to the set print processing of FIG. 2, the controller 10 determines whether or not to add a label, after the label preparation processing of S110 (S111). The set printing application 42 of the first aspect receives a setting on a plurality of the label objects 57 with respect to one sheet object 51. Therefore, after the setting on one or more label objects 57 is completed, the controller 10 displays, on the user IF 20, a button 61 for receiving an addition of a label and a button 62 for receiving a print instruction, as shown in section (A) in FIG. 6, for example, and receives a user's instruction.

When it is determined that an instruction to add a label is received as a result of an operation on the button 61 (S111: YES), the controller 10 re-executes the label preparation processing (S110). In the label preparation processing of setting a second label object 57 and thereafter, the controller 10 displays, on the user IF 20, the label object 57 and sheet object 51 already prepared, and receives a setting on a new label object.

Figure 6:
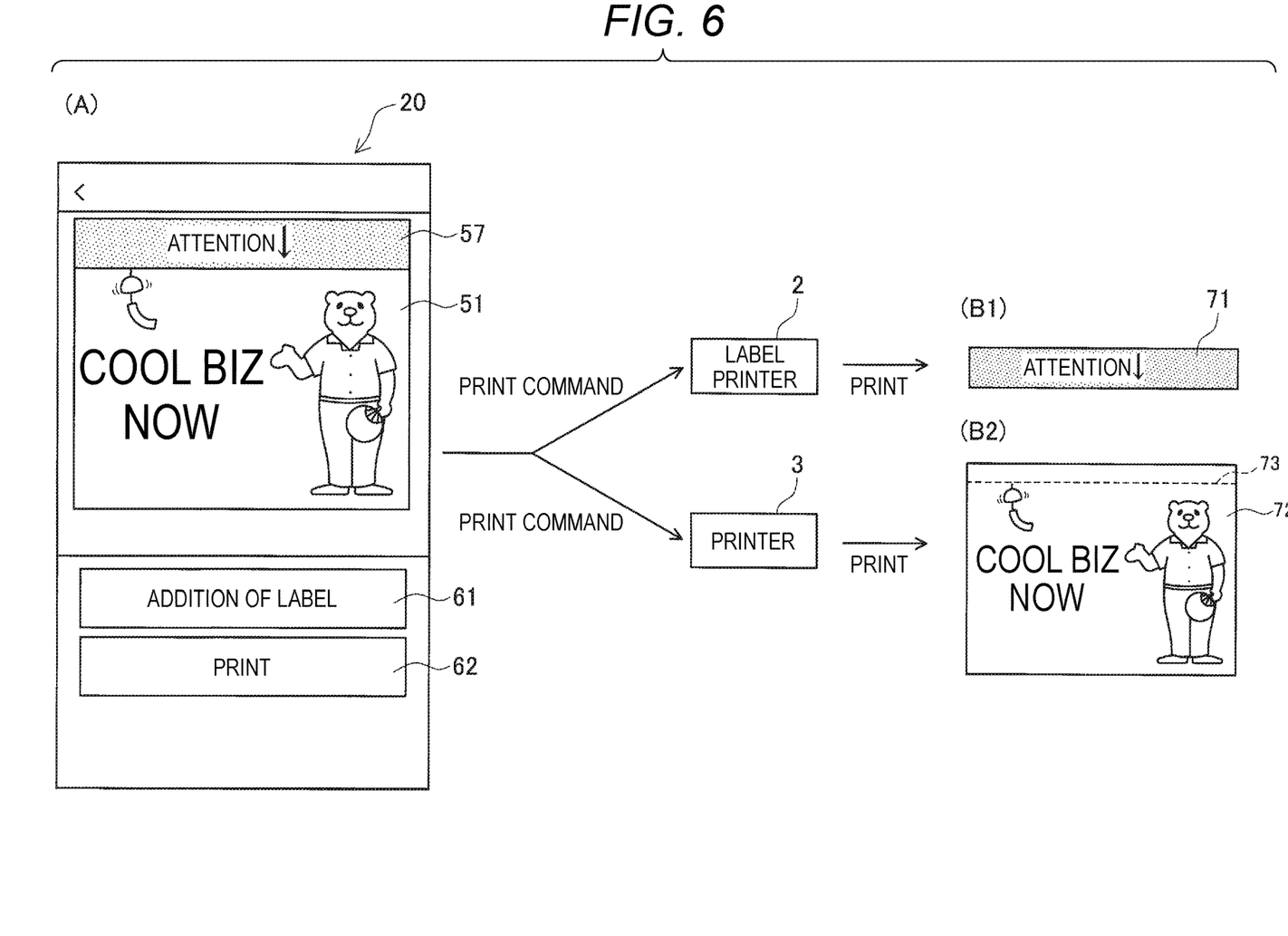
FIG. 6 illustrates an example of printing results made by each of printers.

When it is determined that a print instruction is received as a result of an operation on the button 62, not the addition of a label (S111: NO), the controller 10 executes print execution processing, as shown in FIG. 6, for example (S112). The print execution processing is processing in which printing based on the label object 57 and printing based on the sheet object 51 are respectively executed by each of the printers. The print execution processing is an example of a print processing. A sequence of the print execution processing is described with reference to a flowchart of FIG. 7.

Figure 7:
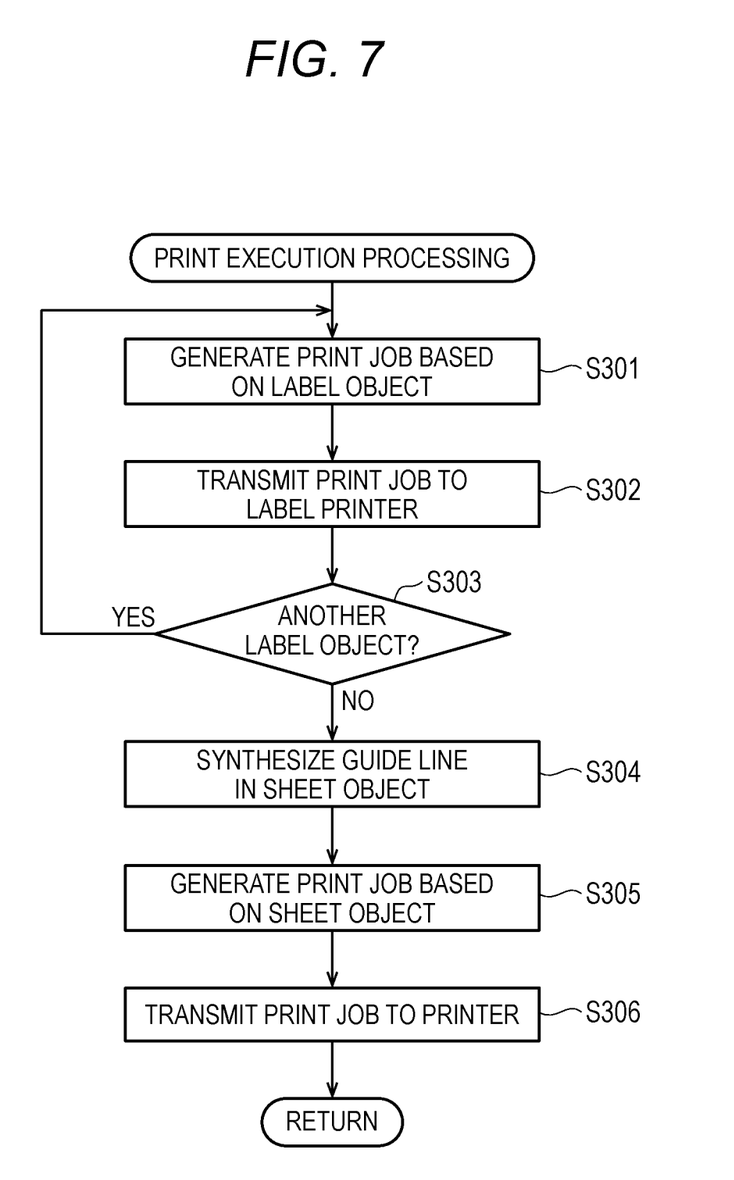
FIG. 7 is a flowchart depicting a sequence of print execution processing.

In the print execution processing, the controller 10 generates a print job for causing the label printer 2 to execute printing based on the label object 57 under display (S301). The controller 10 generates the print job, based on image data of characters and the like included in the label object 57 and the diverse print settings such as a margin setting. Also, the controller 10 transmits the generated print job to the label printer 2 (S302). Thereby, for example, as shown in section (B1) in FIG. 6, the label printer 2 executes printing of an image based on the label object 57. Then, a label 71 is generated.

Then, the controller 10 determines whether there is another label object (S303). When it is determined that there is another label object (S303: YES), the controller 10 returns to S301, generates a print job based on a next label object, and transmits the print job to the label printer 2.

When it is determined that there is no other label object (S303: NO), the controller 10 synthesizes a guide line in the sheet object 51 (S304). The guide line is an image indicative of at least a part of an edge of the display position of the label object 57, with respect to a position in which the sheet object 51 and the label object 57 are displayed with being overlapped. As the guide line, for example, a dotted line indicative of the edge, a mark indicative of a corner and a fill over an entire attaching range may be exemplified. In a case where a plurality of label objects is set, the controller 10 synthesizes the guide line for each of the label objects.

Then, the controller 10 generates a print job for causing the printer 3 to execute printing, based on the sheet object 51 having the guide line synthesized therein (S305). The controller 10 generates, for example, the print job including an image of the sheet object 51, based on the print setting of the printer 3. Then, the controller 10 transmits the generated print job to the printer 3 (S306). Thereby, for example, as shown in section (B2) in FIG. 6, the printer 3 executes printing of an image based on the sheet object 51. Thereby, a printed material 72 is generated. In the printed material 72, a guide line 73 based on the position of the label object 57 is printed.

Figure 8:
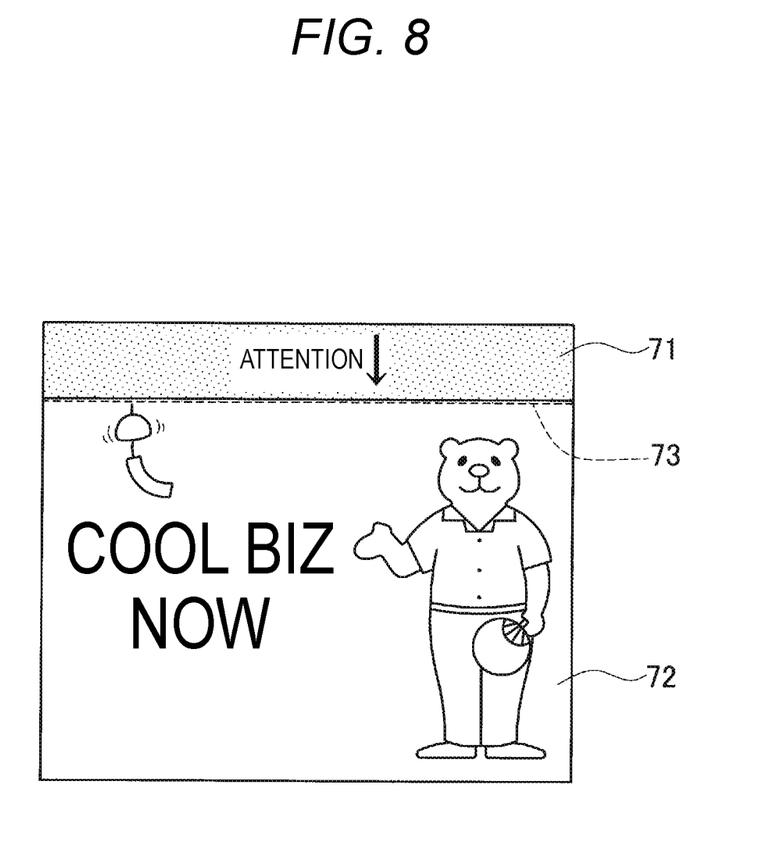
FIG. 8 illustrates an example of a printed material to which a label is attached.

That is, the mobile device 1 of the first aspect receives the operation on one button 62 (section (A) in FIG. 6) to execute both printings (sections (B1) and (B2) in FIG. 6), as shown in FIG. 6, for example. Thereby, the user can attach the label 71 to the printed material 72, as shown in FIG. 8, for example. FIG. 8 is a view showing an image in a state where the label 71 is attached to the printed material 72 by the user. Since the printed material 72 includes the guide line 73, the user can easily position the label 71 when attaching the label 71 to the printed material 72.

The user attaches the label 71 to the prepared printed material 72 along the guide line 73, thereby making a bulletin according to the image displayed on the user IF 20 of the mobile device 1, as shown in FIG. 8. According to the set printing application 42 of the first aspect, for example, it is possible to perform editing while checking an entire image of the printed material such as a poster and the label, and to perform printings of the printed material and the label by one print instruction.

In the meantime, the synthesis timing of the guide line is not limited to a timing after the print instruction is received, and may be each time the display position of the label object 57 is changed. When all the print jobs are transmitted, the controller 10 ends the print execution processing, returns to the set print processing, and ends the set print processing. In the meantime, the sequence for printing the label 71 and the sequence for printing the printed material 72 may be reversed or may be executed in parallel.

Figure 9:
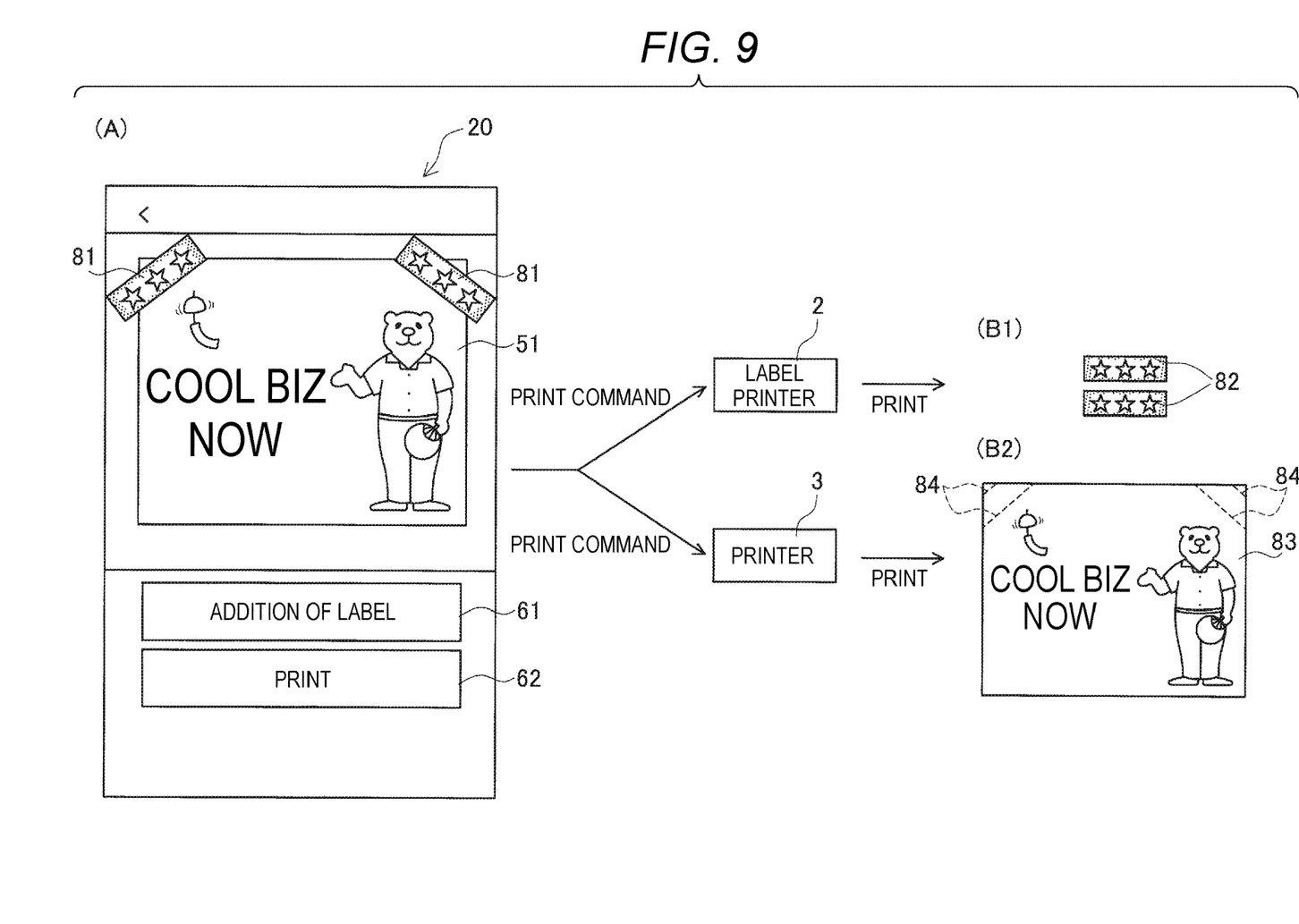
FIG. 9 illustrates an example of printing results including two labels.

As described above, the set printing application 42 of the first aspect receives an additional instruction of a label. An example where two labels are attached to one poster is shown in FIG. 9. As shown in section (A) in FIG. 9, the set printing application 42 of the first aspect receives a setting on a plurality of label objects 81 with respect to one sheet object 51. When an operation on the button 62 is received in the section (A) in FIG. 9, the controller 10 executes the above-described print execution processing.

In the print execution processing, the controller 10 transmits a print command to each of the label printer 2 and the printer 3. As a result, as shown in section (B1) in FIG. 9, the label printer 2 prepares two labels 82 having the same design, and as shown in section (B2) in FIG. 9, the printer 3 prepares a printed material 83. The printed material 83 includes a plurality of oblique guide lines 84 indicative of attaching positions of the respective labels 82 at left and right upper corners.

While checking an entire image when the two labels 82 are attached to the printed material 83 by a display on the user IF 20, the user can manually set display positions and label lengths of the label objects 81. In the meantime, the set printing application 42 may receive, as the additional instruction of the label, an instruction to add the same label, and receive only a setting on a display position of the added label object 81.

As described above in detail, according to the set printing application 42 of the first aspect, the controller 10 displays the label object 57 and the sheet object 51 on the user IF 20. Then, when the print instruction is received, the controller 10 causes the label printer 2 to execute the printing based on the label object 57 and causes the printer 3 to execute the printing based on the sheet object 51. According to this configuration, the operation on one application can cause the separate printers to generate the different printed materials. That is, since it is not necessary to operate different applications for each of the printers, the user's effort is reduced.

Subsequently, a second aspect is described in detail with reference to the accompanying drawings. The second aspect discloses an illustrative embodiment of implementing an application that is executed in a mobile device having a plug-in program configured to perform processing relating to the printer 3. The second aspect is different from the first aspect, in terms of a part of the sequence of the print execution processing. Therefore, the similar configuration and processing to the first aspect are denoted with the same reference signs as the first aspect and the descriptions thereof are omitted.

Figure 10:
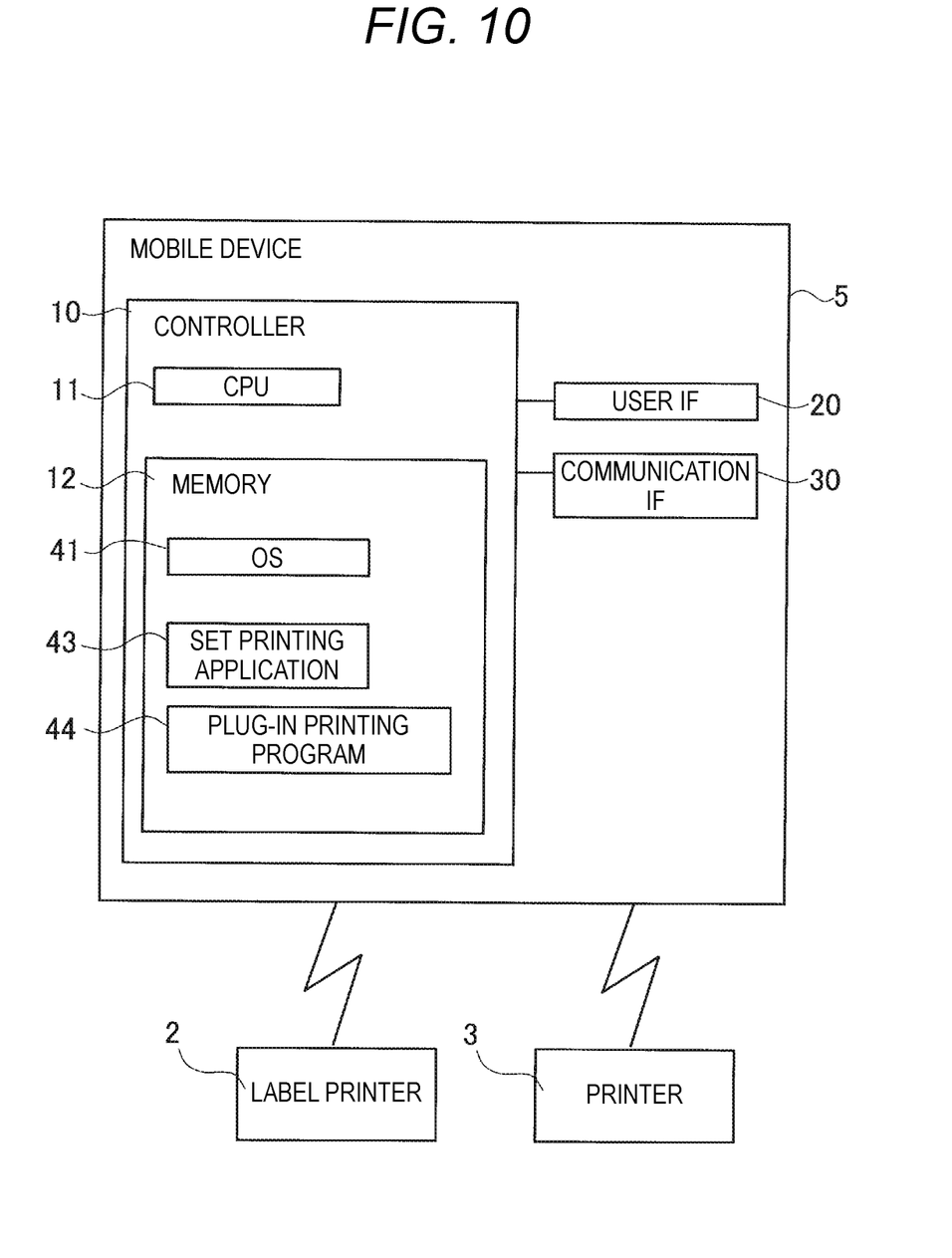
FIG. 10 is a block diagram depicting an electrical configuration of a mobile device.

As shown in FIG. 10, a mobile device 5 of the second aspect includes a controller 10 having a CPU 11 and a memory 12, a user IF 20, and a communication IF 30, and the user IF 20 and the communication IF 30 are electrically connected to the controller 10. The mobile device 5 is an example of an information processing device. In the memory 12 of the mobile device 5, an OS 41, a set printing application 43, and a plug-in printing program 44 are stored. The plug-in printing program 44 is an example of printing program.

The set printing application 43 of the second aspect does not include the processing of generating and transmitting a print job that is executed by the printer 3, as compared to the set printing application 42 of the first aspect. The set printing application 43 causes the plug-in printing program 44 to execute the processing of generating and transmitting a print job. The plug-in printing program 44 is, for example, a program that is provided by a vendor of the printer 3, and adds a printing function to the set printing application 43.

Figure 11:
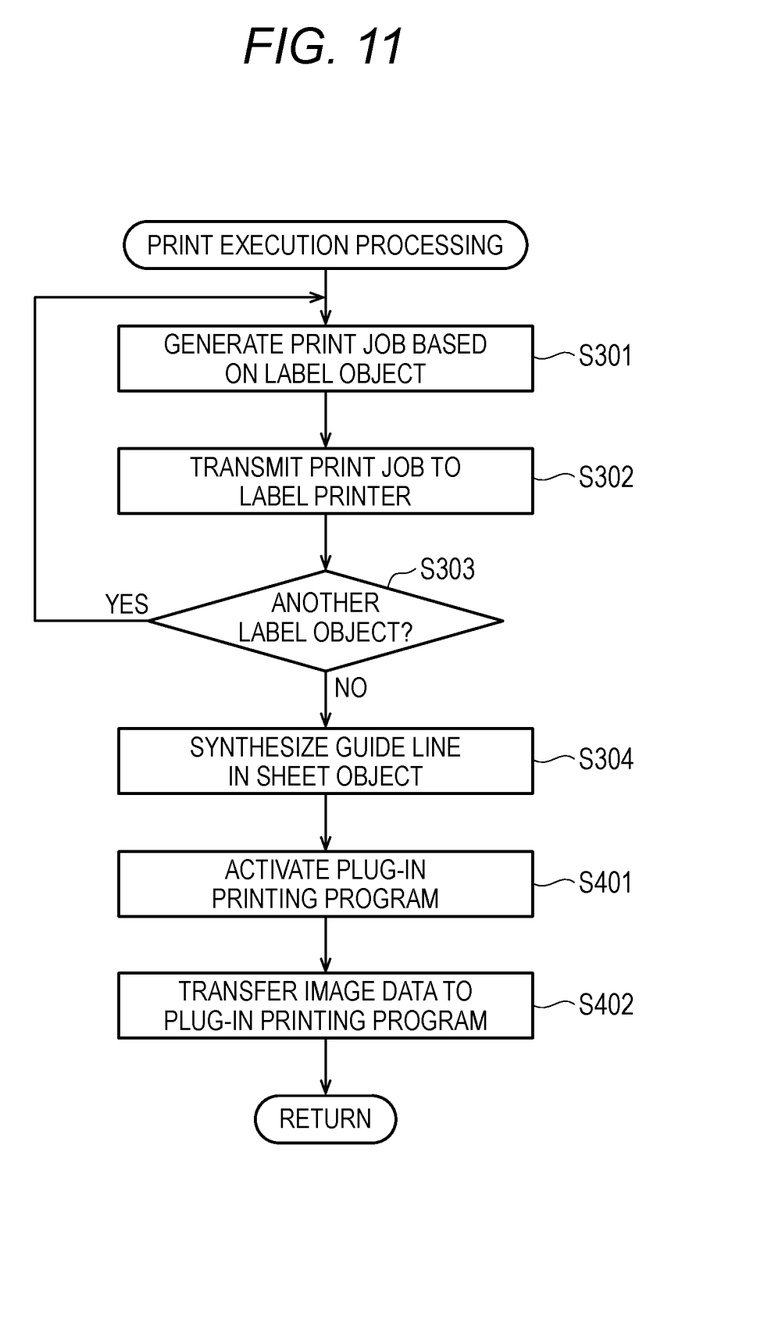
FIG. 11 is a flowchart depicting a sequence of print execution processing.

A sequence of the print execution processing of the second aspect is described with reference to a flowchart of FIG. 11. The print execution processing of the second aspect is also an example of the print processing. In the print execution processing of the second aspect, the controller 10 generates a print job that is transmitted to the label printer 2, and transmits the generated print job to the label printer 2, like the first aspect (S301 to S303). Also, the controller 10 synthesizes a guide line in the sheet object 51 (S304).

Then, the controller 10 activates the plug-in printing program 44 (S401). Also, the controller 10 transfers, to the activated plug-in printing program 44, information indicative of an instruction for causing the printer 3 to execute printing, image data based on the sheet object 51 having the guide line synthesized therein, and a print setting (S402). The plug-in printing program 44 generates a print job suitable for the printer 3, based on the received image data, and transmits the generated print job to the printer 3. Thereby, the printer 3 executes printing of an image based on the sheet object 51, so that a printed material 72 is generated, like the first aspect.

In the second aspect, the set printing application 43 is not necessarily required to have a function corresponding to the printer 3, such as a function of performing communication with the printer 3, so that the processing of the set printing application 43 is simplified. Also, the printing function is separated from the set printing application 43, so that individual maintenance such as version-up of the printer 3 can be easily performed.

In the meantime, the plug-in printing program 44 may be a program configured to further search for the printer 3 that is caused to execute printing and to obtain information indicative of a capability and a state of the printer 3, for example. In this case, for example, when it is determined in S101 of the set print processing that a device is not set, the set printing application 43 may activate the plug-in printing program 44 to cause the plug-in printing program 44 to search for the printer 3 and to obtain the capability information of the printer. The plug-in printing program 44 is caused to execute all processing including communication with the printer 3, so that the set printing application 43 can deal with the printer 3 that is provided by a vendor different from the set printing application. Also, the plug-in printing program 44 may have a function of receiving a print setting of a print job that is executed by the printer 3.

Also, not only the processing relating to the printer 3 but also the processing relating to the label printer 2 may be further executed by a separate plug-in program. In this case, the set printing application 43 may transfer image data based on the label object 57 to the plug-in program corresponding to the label printer 2.

As described above, even with the set printing application 43 of the second aspect, it is possible to generate the different printer materials by the separate printers with the operation on one application and it is not necessary to operate different applications for each of the printers, so that the user's effort is reduced.

The illustrative embodiments discussed herein are just exemplary and do not limit the present disclosure. Therefore, the technology disclosed herein can be diversely improved and modified without departing from the gist thereof. For example, the printer of the type other than the label printer is not limited to the printer having a single function, and may be any apparatus having a printing function on a sheet and the like, such as a complex machine, a copier, a FAX apparatus, and the like.

The information processing device may not be limited to the mobile device, and may be a desktop-type device such as a PC. The type of the OS 41 that is installed in accordance with a type of the device is not limited to the OS exemplified in the illustrative embodiments. For example, Microsoft Windows (registered trademark), Mac OS (registered trademark) and Linux (registered trademark) are also possible.

The label printer 2 and the printer 3 connected to the mobile device 1 may not be limited to one printer, respectively, and may be a plurality of printers, respectively. For example, in a case of the mobile device 1 to which a plurality of label printers in which types of the set label papers are different is connected, an appropriate label printer is selected in accordance with a label object to be printed, and a print job is transmitted to the selected label printer, so that a plurality of labels using different types of label papers can be prepared.

In the above-described illustrative embodiments, the example where the combination of the label 71 to be prepared by the label printer 2 and the printed material 72 to be prepared by the printer 3 is prepared has been described. However, the present disclosure is not limited thereto. For example, a program configured to execute processing of causing a separate printer to print a turning part, which is attached with overlapping a part of a large poster, may also be possible.

In the above-described illustrative embodiments, the guide line is synthesized in the sheet object 51, but may not be synthesized. That is, upon the printing, the change on the image of the sheet object 51 may not be performed.

In the above-described illustrative embodiments, the manual setting on the label position and label length is received, but may not be received. For example, only a designation of any one side of the sheet object 51 may be received, and only a selection from a plurality of types of preset selection options may be received.

In the set print processing of the illustrative embodiments, in S103, the communication with each device is performed to obtain the capability thereof, but may not be performed. That is, it is sufficient that the capability and the default print setting of the selected device can be obtained. For example, the capability and the default print setting may be obtained from the OS 41. Also, if the print setting upon previous execution is stored, it may be obtained based on the stored information.

In the above-described illustrative embodiments, when the automatic arrangement on the upper or lower side of the sheet object 51 is received, the characters are horizontally written, and when the automatic arrangement on the left or right side is received, the characters are vertically written. However, the present disclosure is not limited thereto. For example, the horizontal writing or vertical writing can be freely set.

In the above-described illustrative embodiments, when a designation to adjust the label length to the character length is received, the margin setting is further received, but may not be received. For example, the automatic setting on the label length may be made only on the entire side length or character length and the other settings may be received by the manual settings.

In any flowchart in the above-described illustrative embodiments, the plurality of processing in the plurality of any steps can be arbitrarily changed in terms of the execution sequence, or may be executed in parallel within a scope which does not cause inconsistency in processing contents.

The processing of the above-described illustrative embodiments may be executed by hardware such as a single CPU, a plurality of CPUs, an ASIC and the like or a combination thereof. The processing disclosed in the embodiments may be implemented in diverse forms such as a recording medium having a program for executing the processing, a method and the like.

What is claimed is:

1. A non-transitory computer-readable medium storing an application program readable by a computer of an information processing device, the application program, when executed by the computer, causes the information processing device to perform:
    displaying a first image object and a second image object on a display device of the information processing device; and
    based on receiving a print instruction via an input device of the information processing device, controlling a first printer to perform printing of a first image based on the first image object and a second printer to perform printing of a second image based on the second image object;
wherein in the displaying, the first image object is displayed with at least a part of the first image object being overlapped over the second image object.

2. The non-transitory computer-readable medium according to claim 1, wherein in the controlling, the application program causes the information processing device to:
    control the second printer to print the second image with a guide line being synthesized at a position corresponding to at least a part of an edge at which the first image object is overlapped over the second image object.

3. The non-transitory computer-readable medium according to claim 1, wherein the application program, when executed by the computer, further causes the information processing device to perform:
    based on receiving an instruction to change a display position of the first image object via the input device, changing the display position of the first image object.

4. The non-transitory computer-readable medium according to claim 3, wherein in the changing of the display position, the first image object is arranged with being partially overlapped on one side of the second image object in an upper and lower direction or in a right and left direction.

5. The non-transitory computer-readable medium according to claim 1,
    wherein a printing program having a function of transmitting a print job to the second printer is installed in the information processing device, and
    wherein in the controlling, based on receiving the print instruction, the application program causes the information processing device to activate the printing program and transfer the image based on the second image object to the printing program, so as to cause the second printer to perform printing via the printing program.

6. The non-transitory computer-readable medium according to claim 1, wherein the application program, when executed by the computer, further causes the information processing device to perform:
    selecting the first printer and the second printer from printers connected to the information processing device; and
    on a condition that the first printer and the second printer are selected, receiving settings on the first image object and the second image object via the input device.

7. A non-transitory computer-readable medium storing an application program readable by a computer of an information processing device, the application program, when executed by the computer, causes the information processing device to perform:
    displaying a first image object and a second image object on a display device of the information processing device; and based on receiving a print instruction via an input device of the information processing device, controlling a first printer to perform printing of a first image based on the first image object and a second printer to perform printing of a second image based on the second image object;

wherein the first printer is a label printer, and wherein the second printer is a printer of a type other than the label printer.

8. The non-transitory computer-readable medium according to claim 7, wherein the application program, when executed by the computer, further cause the information processing device to perform:

based on receiving an instruction to adjust a size of the first image object via the input device, changing a length of a label in a first direction based on a length of the second image object in an upper and lower direction or in a right and left direction, the first image being to be printed on the label, the first direction corresponding to a conveying direction of the label in the first printer.

9. A non-transitory computer-readable medium storing an application program readable by a computer of an information processing device, the application program, when execute by the computer, causes the information processing device to perform:

setting a first image object, the first image object being to be printed by a first printer, the first printer being a label printer;

setting a second image object, the second image object being to be printed by a second printer, the second printer being a printer of a type other than the label printer; and based on receiving a print instruction via an input device of the information processing device, controlling the first printer to perform printing of a first image based on the first image object and the second printer to perform printing of a second image based on the second image object.

10. The non-transitory computer-readable medium according to claim 9, wherein the controlling, the application program causes the information processing device to:

control the second printer to print the second image with a guide line being synthesized at a position corresponding to at least a part of an edge at which the first image object is overlapped over the second image object.

11. A method for controlling an information processing device to perform:

displaying a first image object and a second image object on a display device of the information processing device; and based on receiving a print instruction via an input device of the information processing device, controlling a first printer to perform printing of a first image based on the first image object and a second printer to perform printing of a second image based on the second image object;

wherein in the displaying, the first image object is displayed with at least a part of the first image object being overlapped over the second image object.

12. The method according to claim 11, wherein in the controlling, the method causes the information processing device to:

control the second printer to print the second image with a guide line being synthesized at a position corresponding to at least a part of an edge at which the first image object is overlapped over the second image object.

13. The method according to claim 11, wherein the method further controls the information processing device to perform:

based on receiving an instruction to change a display position of the first image object via the input device, changing the display position of the first image object.

14. The method according to claim 13, wherein in the changing of the display position, the first image object is arranged with being partially overlapped on one side of the second image object in an upper and lower direction or in a right and left direction.

15. The method according to claim 11, wherein a printing program having a function of transmitting a print job to the second printer is installed in the information processing device, and wherein in the controlling, based on receiving the print instruction, the method causes the information processing device to activate the printing program and transfer the image based on the second image object to the printing program, so as to cause the second printer to perform printing via the printing program.

16. The method according to claim 11, wherein the method further controls the information processing device to perform:

selecting the first printer and the second printer from printers connected to the information processing device; and on a condition that the first printer and the second printer are selected, receiving settings on the first image object and the second image object via the input device.

17. A method for controlling an information processing device to perform:

displaying a first image object and a second image object on a display device of the information processing device; and based on receiving a print instruction via an input device of the information processing device, controlling a first printer to perform printing of a first image based on the first image object and a second printer to perform printing of a second image based on the second image object;

wherein the first printer is a label printer, and wherein the second printer is a printer of a type other than the label printer.

18. The method according to claim 17, wherein the method further controls the information processing device to perform:

based on receiving an instruction to adjust a size of the first image object via the input device, changing a length of a label in a first direction based on a length of the second image object in an upper and lower direction or in a right and left direction, the first image being to be printed on the label, the first direction corresponding to a conveying direction of the label in the first printer.

* * * * *